Jan. 21, 1969    R. GROEPLER    3,422,713
APPARATUS FOR GRANULATING PLASTIC STRING
Filed Dec. 19, 1966    Sheet 2 of 4
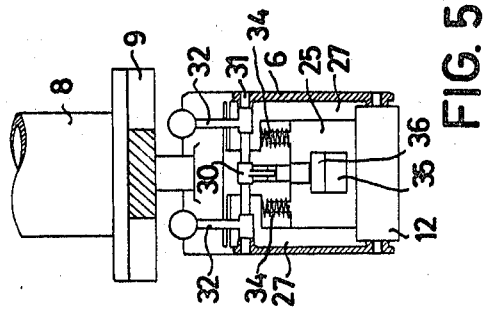
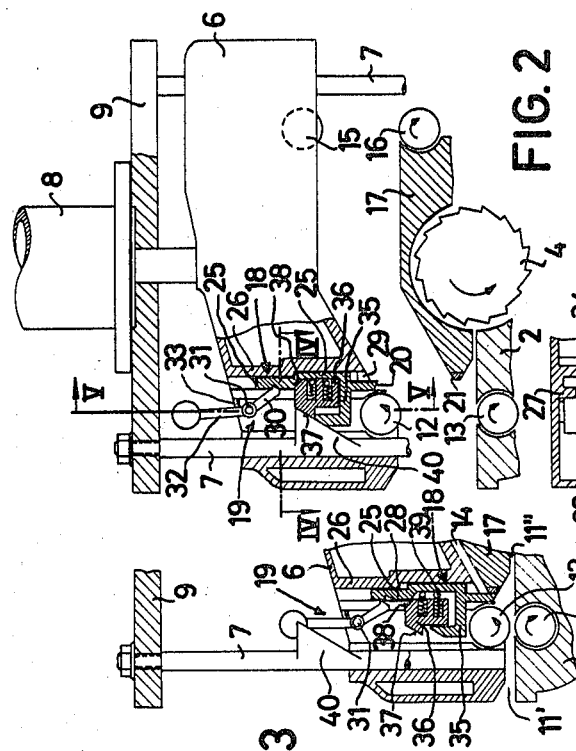
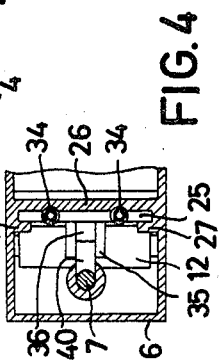
INVENTOR.
RUDI GROEPLER
BY
Bair, Freeman & Molinare
Attys.

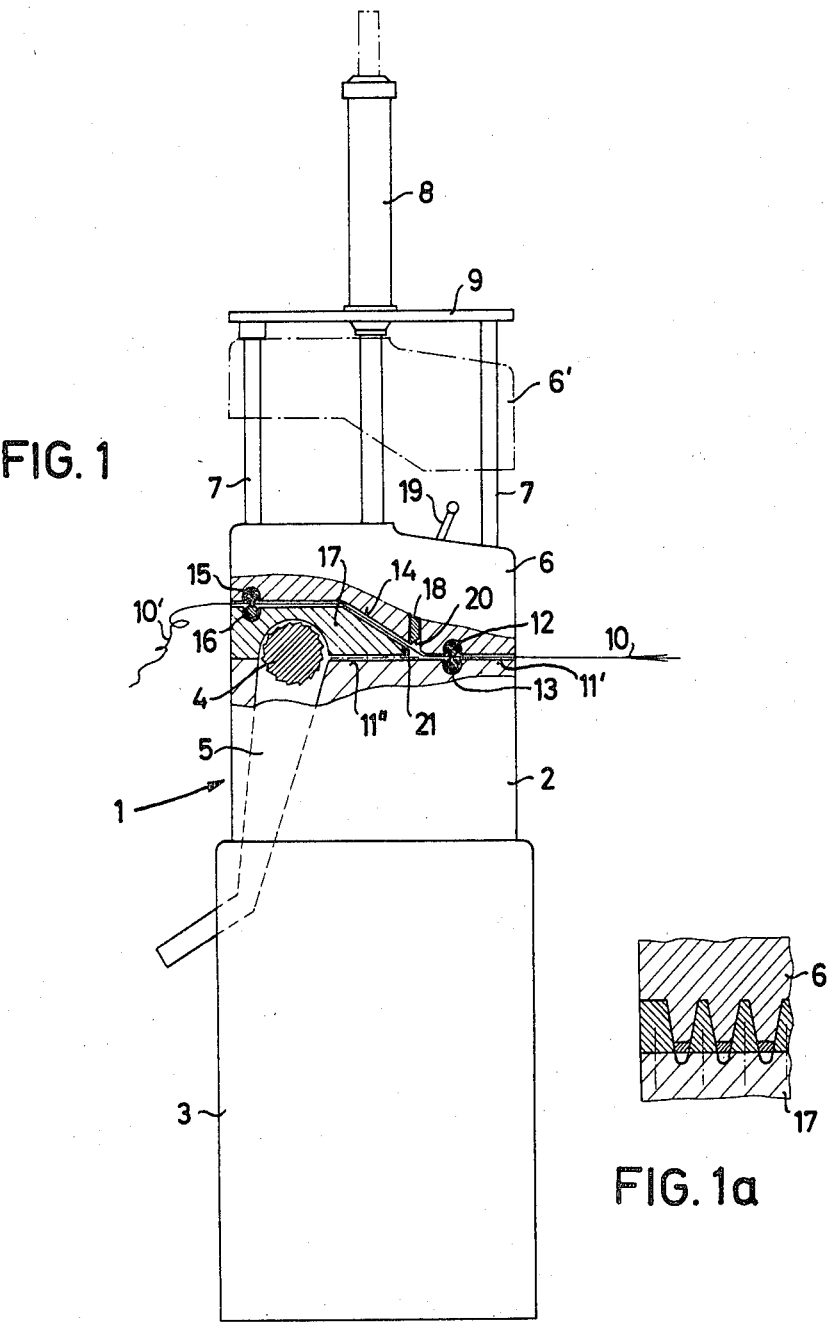

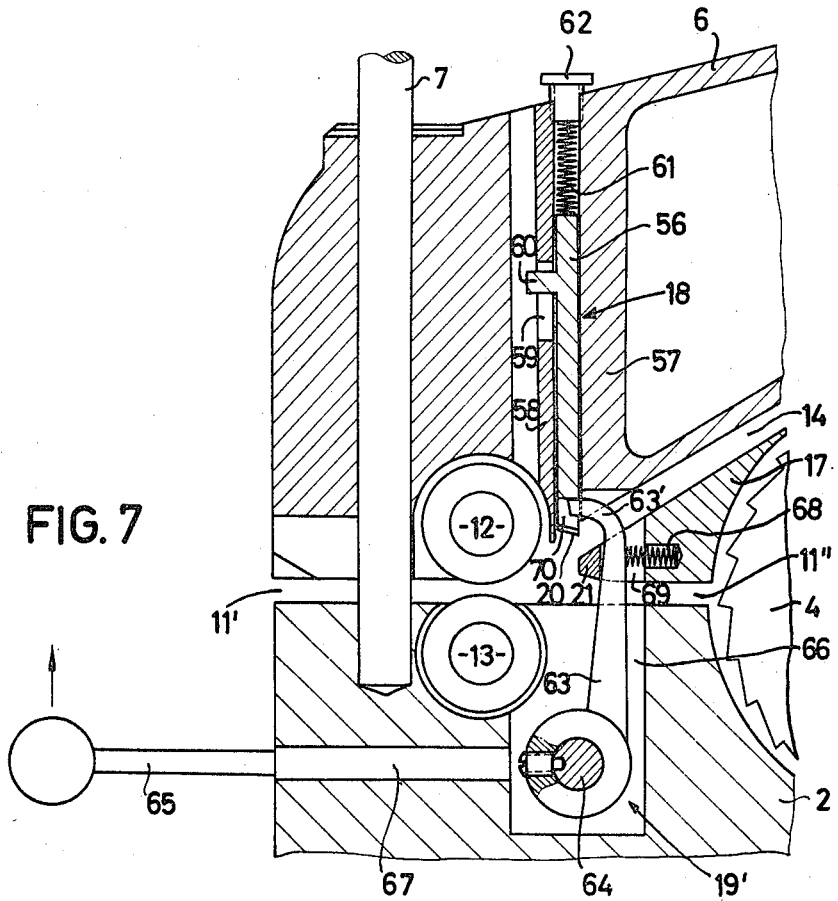
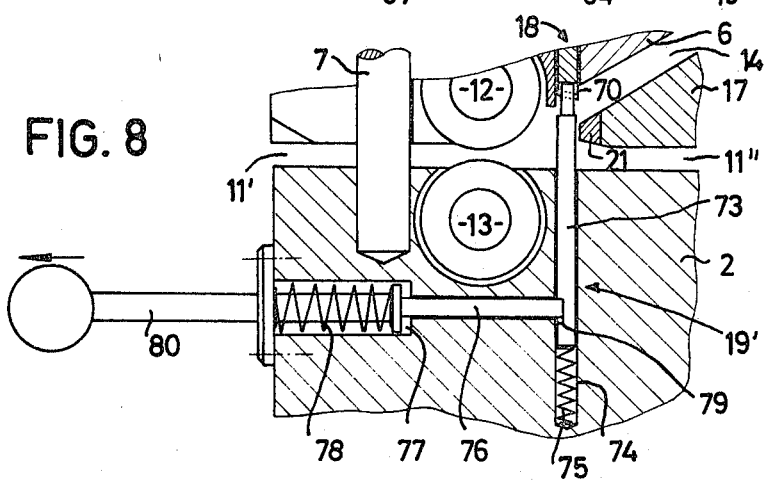

United States Patent Office 3,422,713
Patented Jan. 21, 1969

3,422,713
APPARATUS FOR GRANULATING PLASTIC STRING
Rudi Groepler, Schoenberg, Taunus, Germany, assignor to Vickers-Zimmer Aktiengesellschaft, Planung und Bau Industrieanlagen
Filed Dec. 19, 1966, Ser. No. 602,996
Claims priority, application Germany, Dec. 18, 1965, Z 11,926
U.S. Cl. 83—156      8 Claims
Int. Cl. B26d 7/06, 5/22

ABSTRACT OF THE DISCLOSURE

A granulator for cutting continuously extruded plastic string wherein the granulator has a fixed base and a movable cover to cover the base. A guide track for the string is defined between the base and the cover. The string is fed in the guide track and a cutter is provided in the guide track to cut the string. The guide track is intercepted by a by-pass guide track for the string which passes around the cutter. Where the by-pass intercepts the guide track, a blade is positioned and is held in the raised position when the cover is down against the base. At the desired time when the plastic string is moving in the by-pass track, the blade is released to simultaneously sever the plastic string moving to the by-pass portion, block the by-pass portion, and cause introduction of the cut ends of the string to the guide track which leads to the cutter.

---

This invention relates to apparatus for granulating or cutting up continuously extruded plastic strings.

In synthetic fiber technology and in related fields, the plastic material is first extruded in the form of relatively thick strings, granulated and, in the granulated state, is subjected to an intermediate treatment before being melted and finally worked, such as being spun into threads. The subject of this invention relates to the granulator apparatus which performs the granulating of the relatively thick plastic strings.

In known granulator constructions, a number of parallel-running plastic strings, such as twelve in number, are fed over a string guide to a cutting tool, which is advantageously a blade roller. The string guide contains a number of conduction or guide apertures corresponding to the number of plastic strings, which run parallel to one another in the horizontal plane and lead from the front of the string guide to the cutting tool. Also, two advance rollers are normally provided to engage with the guide apertures. These advance rollers serve the purpose of simultaneously gripping the plastic strings introduced into the guide apertures and transporting them to the cutting tool.

Among the known granulators there are those having a string guide consisting of a base portion and a cover, wherein the guide apertures are constructed as grooves in the joint separating the base portion and the cover. With this design, it is the purpose to change the cross section of the guide grooves to adapt them to the particular diameter of the plastic strings by changing the cover.

All the granulators of the type described have been very successful for continuous operation, but have a significant drawback in that it is difficult and complicated to charge them with plastic strings at the start up of operations. To begin operation, the plastic strings being extruded continuously from a string pressing head must be manually grasped individually one after the other (under some circumstances, protective gloves or a suitable caliper are required) and then introduced into the roller gap between the advance rollers. This is a time and labor consuming operation, particularly since in introducing the plastic strings, winding formations frequently occur on the advance rollers. There is also a danger that the plastic strings will not be moved at a constant velocity from the spring pressing head, so that they either break or, through formation of thickenings, clog the granulator.

Particularly in starting the granulators in operation, one problem is that during the introduction of one string, the other strings have to run on the base and must first be manually cut to the right length before they can be introduced to the granulator. The cut ends of these strings are scrapped. In the high extrusion speeds, this leads to considerable waste of material, which may become even greater because the strings running on the base become tangled and cannot be separated from one another quickly enough.

In order to reduce the problems involved in the beginning operations of the granulators, auxiliary devices have been proposed for gripping the plastic strings immediately after extrusion from the string pressing head for supplying them to the cutting tool. These auxiliary devices include a catch roller positioned under the string pressing head, which is provided with circumferential grooves. The catch roller picks up the extruded plastic strings with its circumferential grooves and then transfers them to a transport belt leading to the cutting tool. Such auxiliary devices, however, have not been proven to be successful in practical use because they increase production costs during the granulating stage, and also because they are extremely susceptible to breakdowns. The plastic strings, just after extruding, still have a slightly sticky surface so that they are not always readily detached from the catching roller. This is especially true at relatively high extrusion speeds.

It is therefore an object of this invention to provide an improved granulating device for plastic strings wherein the disadvantages of the known devices are substantially avoided.

It is also an object of this invention to provide a plastic string granulator device wherein the start-up problems of the granulator are substantially avoided.

It is a further object of this invention to provide a granulator which does not require the use of auxiliary devices to supply the plastic string to the cutting tool.

Further purposes and objects of this invention will appear as the specification proceeds.

The foregoing objects are accomplished by the present invention wherein the string conduction from the guide track branches off to a by-pass around the cutting tool passing to the back of the granulator. The guide grooves are aligned with the guide track and are covered by a raisable cover wherein in the open position, the grooves are free for the insertion of the plastic strings. At the level of the end of the by-pass on the guide track side, there is movably carried in the cover a spring-loaded cut-off blade whose cutting edge, when closed, is arrested in an upper end position above the by-pass track. After operation of a releaser, the blade passes through the by-pass track into a lower end position directly above the guide track, during which movement it cuts off the plastic strings in the by-pass track and introduces these into the guide track and simultaneously blocks the by-pass track from the guide track.

Through the invention, simple means are provided so that the granulator can be charged, even by relatively untrained personnel, rapidly and surely in the start-up operation with the plastic strings running off from the string pressing head. For the charging operation, the raisable cover is first moved into the upper position (such as by operation of a simple hand or foot shifting device) so that the guide grooves in the by-pass track, which advantageously expand in a funnel form in an upward direction, are exposed. The plastic strings are then grasped, several at a time, and with great speed are sorted into the appropriate guide grooves. As soon as this is done, the cover is lowered. Before or during the lowering of the cover, the plastic strings are conveniently pulled by hand into the correct position by manually gripping them at their ends protruding at the back of the granulator, so that in the entire distance from the extrusion pressing head to the granulator they run in order parallel to one another. They then automatically retain this position thereafter because when the cover is completely lowered, the advance rollers (one being in the base portion and one being in the cover) go into operation, taking over the uniform movement of the plastic strings.

After closing the cover and after determining the orderly position of the plastic strings, the cut-off blade in the cover is released. At this time, the cut-off blade cuts off the plastic strings at the place of their entry into the by-pass track. Simultaneously the blade presses its cutting edge (which is advantageously designed sloping toward the inlet side of the plastic string) into the new string ends resulting from the cut off so that these can enter into the portion of the guide track leading to the cutting tool. The normal working operation of the granulator then commences.

The cut-off string sections positioned in the by-pass track are drawn out of the by-pass track after releasing the cut-off blade at the rear of the granulator, advantageously with the aid of a pair of withdrawal rollers which are synchronously driven with the advance rollers and lie with their gap in the by-pass track. Of these withdrawing rollers one is carried in the cover and one in the deflection block.

The speed of the charging operation is determined by manual operations from starting the insertion of the plastic strings to the complete lowering of the cover. These manual operations can be carried out very rapidly because it is no longer necessary to thread the individual plastic strings successively into a constantly closed roller gap inside the guide grooves. To the contrary, the roller gap is not formed until all the plastic strings have been placed in the proper position relative to each other. The plastic strings do not, at the moment of formation of the roller gap, run to the cutting tool, but only into the by-pass track. However, there is only a single manual operation, that is, the operation of the cut-off blade in order to deflect the strings from the by-pass track into the guide track proper.

Thus, the granulator of this invention assures a rapid, convenient and practically trouble-free start-up of operation, wherein the amount of string sections to be rejected as scrap is minimal. The granulator of the invention, therefore, is well suited for intermittent operation.

The track by-passing the cutting tool can either run above or below the cutting tool to the back of the granulator. If the track runs below, however, construction problems are encountered when making the guide grooves of the by-pass track accessible when the cover is open since the cutting tool is carried in the cover. Therefore, it is preferable to have the by-pass track run above the cutting tool. This can be accomplished in a rather simple manner since the base portion of the string conduction, in the zone of the cutting tool and in the zone of the rear portion of the guide track adjoining the cutting tool, is covered with a stationary deflection block whose cover-side boundary surface forms the by-pass track. The deflection block may be of unitary construction with the base portion of the granulator.

In order to assure a positive cut-off of the plastic strings, it is desirable to provide a fixed counter-edge for the cutting edge of the cut-off blade. This fixed counter-edge may be the front edge of the deflection block facing toward the inlet side.

It is also advantageous to design the cut-off blade in such a way that during the raising of the cover it automatically passes into its upper end position, where it is arrested. To accomplish this a mechanical clamping device may be provided for the cut-off blade to interact, on raising the cover, with a stationary stop and press the cut-off blade upward against the action of load springs. It is also possible to have the releasing device take over the function of clamping by an arrangement whereby the cut-off knife, in the lowering of the cover, comes to rest on the releasing device and no longer follows the further lowering movement of the cover. In one case, the clamping device and the releasing device are arranged in the cover. In another case, the releasing device is carried in the base part, and therefore actually is a stationary element relative to the cover.

Particular embodiments of the present invention are illustrated in the accompanying drawings wherein:

FIGURE 1 is a general schematic view of a granulator constructed according to the invention;

FIGURE 1a is a detail of the portion of the granulator shown in section in FIGURE 1;

FIGURE 2 is a partially sectional view of one embodiment of the granulator of FIGURE 1 when the cover is in the open position;

FIGURE 3 is a view of the granulator shown in FIGURE 2 except that the cover is in the closed position;

FIGURE 4 is a sectional view along the line IV—IV of FIGURE 2;

FIGURE 5 is a sectional view along the line V—V of FIGURE 2;

FIGURE 7 is still another embodiment of the granulator of FIGURE 1 shown in section and with the cover closed; and FIGURE 8 is a sectional view of a modification of the embodiment of FIGURE 7.

Figure 6:
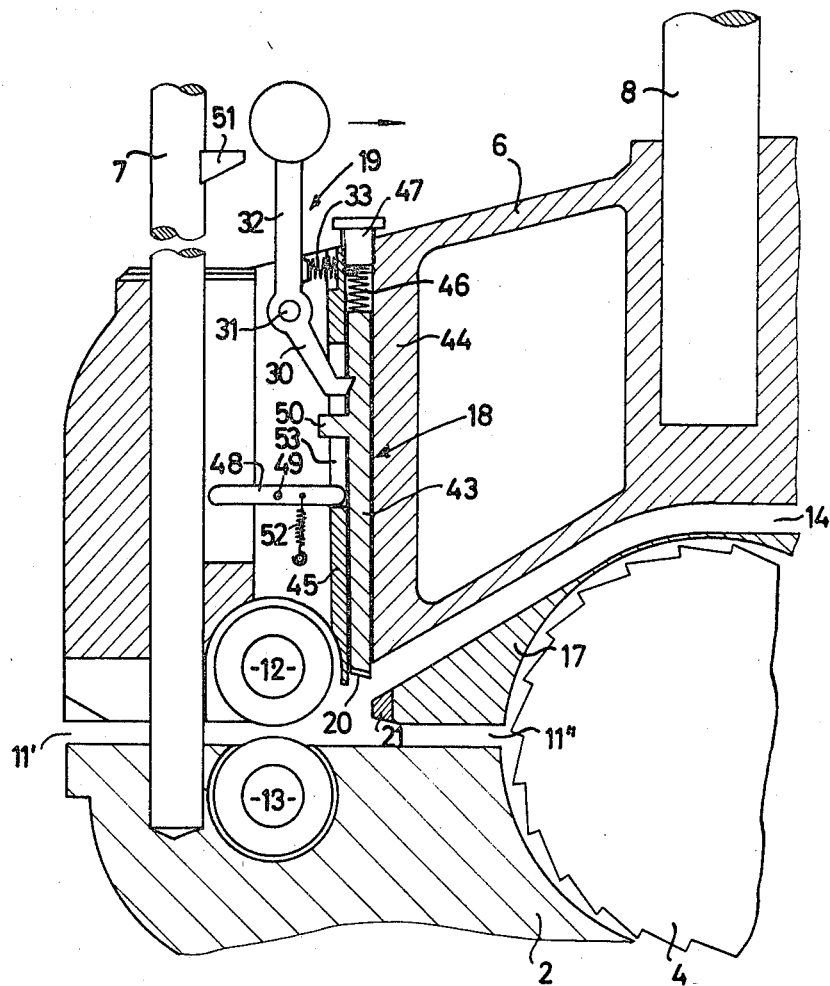
FIGURE 6 is another embodiment of the granulator of FIGURE 1 shown in section and with the cover closed.

For explaining the fundamental construction and operation of the granulator according to the invention, reference is made to the general schematic view of FIGURE 1. The granulator has a structural unit 1 which is secured to a base 3, containing various drive and control devices. The string conduction system contains a stationary base 2 and a raisable cover 6. In the base 2, a cutting tool 4 is provided and is in the form of a rotatably mounted blade roller, from which a removable chute 5 extends to the back of the granulator. The cover 6 is slidably carried on guide columns 7 and is operated by a pneumatic or hydraulic lifting device 8, which is secured to a transverse member 9 which joins the upper ends of the guide columns 7 together.

A plurality, such as twelve, of parallel-running plastic strings 10 are supplied to the granulator 1. These plastic strings are drawn from an extrusion head and may be pretreated in a usual manner, such as by being drawn through a treatment bath. They are carried along inside the granulator 1 by two interacting advance rollers 12 and 13 which are positioned along a horizontal guide track 11, which extends to the cutting tool 4. The string is granulated by the cutting tool and the granulate is delivered into the chute 5. The guide track 11 begins at the front of the granulator 1 and terminates at the cutting tool 4 substantially at the level of the axis of rotation. In order to assure a faultless conduction of the plastic strings, the guide track 11 advantageously has a number of parallel guide grooves for receiving the plastic strings.

Within the granulator 1, there is provided a second guide track 14 for the plastic strings 10. This second or by-pass guide track 14 branches upward from the track 11 at a position between the cutting tool 14 and the rollers 12 and 13 and then runs above the cutting tool 4 to the back of the granulator 1. The by-pass track is preferably constructed according to the first guide track 11 by having a number of parallel guide grooves which are aligned with the corresponding guide grooves of the guide track 11. Further, the track 14 includes two interacting discharge pull rollers 15 and 16, which are synchronously driven with the two advance rollers 12 and 13.

To form the by-pass track 14 there is a separating joint between the cover 6 and a deflection block 17 which is fixed to the base 2. This deflection block 17 covers the base part 2 in the zone of the cutting tool and has, starting at its fixed front edge 21 just above the guide track 11, an upper boundary surface which first runs angularly upward and then horizontally to the back of the granulator. Offset of the deflection block 17, the contour of the cover 6 follows the horizontal upper boundary surface of the base 2 and its separating joint forms with the base 2 a front stretch 11' of the guide track 11 which extends from the granulator front to the front edge 21 of the deflection block 17 where the deflection track 14 branches. The rear stretch 11' of the guide track 11 extends from the branching of the deflection track 14 to the cutting tool 4 and is located in a separating joint which contains the cover 6 and which is between the lower surface of deflection block 17 and the base 2. Therefore, the rear stretch 11' of the guide track 11 is constantly closed off in the upward direction, even when the cover 6 is raised.

The guide grooves of the guide track 11 and of the deflection track 14 are, as shown in FIGURE 1a, arranged in the upper boundary surface of the base part 2 and of the deflection block 17. In the by-pass track 14 as well as in the front partial stretch 11' of the guide track 11, the grooves preferably expand upward in a funnel shape, the lower boundary surface of the cover 6 corresponding to this form. In the two roller pairs 12, 13 and 15, 16, the upper roller is carried in the cover 6 and the lower roller is carried in the base 2 or in the deflection block 17.

In the cover 6 above the branching of the by-pass track 14, there is provided a spring-loaded, slidably borne cut-off blade 18 having a cutting edge 20 which points downwardly and is desirably beveled toward the front of the granulator 1. This cut-off blade 18 is arrested in the raised position by a releasing device 19, schematically shown in FIGURE 1, so that its cutting edge 20 lies slightly above the lower boundary surface of the cover, its charging spring being under tension. The releasing device 19 is operated when the cover 6 is closed. It causes the cut-off blade 18 to move downwardly with considerable force so the cutting edge 20 crosses the by-pass track 14 in front of the front edge 21, designed as a counter edge for the blade 20, and comes to a stop directly above the guide track 11.

In order to charge the granulator 1 with plastic strings 10 when starting operation, the cover 6 is first raised to the upper position 6' indicated in dot-and-dash lines in FIGURE 1. In this upper position the guide grooves are fully accessible along the front partial stretch 11' of the guide track 11 as well as along the entire by-pass track 14. The plastic strings 10 can, therefore, be easily placed in the grooves by hand. This is accomplished from either side of the granulator, since the guide columns 7 are positioned in the middle of the granulator 1 and, therefore, do not hamper the starting operation. After placing the strings in the grooves, the plastic strings are drawn evenly by hand until the cover 6 is lowered to its closed position. As the granulator is closed, the roller pairs 12, 13 and 15, 16 start operation and provide for the conveyance of the plastic strings 10 along the front partial stretch 11' of the guide track 11 and along the by-pass track 14.

When the orderly running of the inserted plastic strings 10 is stopped when the cover is down, the cut-off blade 18 is released through operation of the releasing device 19. The cut-off blade cuts, at the point which the by-pass track 14 branches off from the guide track 11, all the plastic strings simultaneously. The cut-off end pieces 10' of these plastic strings are then conveyed out of the track 14 through the draw-out rollers 15 and 16 at the back of the granulator 1. The new ends of plastic strings 10 formed by the cutting off are then threaded into the rear partial stretch 11' of the guide track 11. The cut-off blade 18 in its lowered position blocks the by-pass track 14 and simultaneously presents with its sloping cutting edge an upper guide below which the new string ends readily slide into the rear partial stretch 11" of the guide track 11. Thus, the plastic strings 10, after releasing of the cut-off blade 18, are transported through the advance rollers 12 and 13 to the cutting tool 4 where they are granulated.

To construct the granulator 1, described above in its theoretical design and operation, there are a variety of alternate embodiments. This is particularly true for the cut-off blade 18 and the releasing device 19. In FIGURES 2 to 5, there is shown one embodiment of the granulator 1 in which the cut-off blade 18 is clamped by raising the cover 6 into the upper position against the action of its loading spring and is arrested by the releasing device 19. According to the same general principle, but with a somewhat different structure, the cut-off blade 18 is shown in another embodiment in FIGURE 6. In contrast, the embodiments of the granulator 1 shown in FIGURES 7 and 8 contain a cut-off blade 18 clampable only by raising the cover, but which comes into the clamped state only upon lowering of the cover.

In the embodiment of FIGURES 2 to 5, the cut-off blade 18 has a blade 25 having the lower cutting edge 20. This blade 18 is carried slidably in a guide inside the cover 6. The guide, on one side of the blade, has a guide plate 26 and on the other blade side has two lateral guide rails 27. The guide plate 26 has a shoulder stop 28 which coacts with a shoulder on the blade 25 to limit the sliding movement of the blade 18 in the upward direction. For the lower end of the sliding movement of the blade 25 there is a stop block 29 fixed to the guide plate 26, which coacts with another counter-shoulder on the blade 18.

The releasing device 19, which arrests the blade 18 in the raised position, includes a latch 30 connected to a hand grip 32. The grip 32 snaps into rest position in a recess of the blade 25 and is acted upon, in the engaging direction, by a suitable spring 33. The latch 30 may be rotatably carried by the shaft 31 which simultaneously carries the hand grip 32.

In the raised position of the cut-off blade 18 shown in FIGURE 2 with a reduced distance between the base 2 and cover 6, the upper shoulder of the blade 25 is positioned at or in the proximity of the stop shoulder 28. The lower shoulder is spaced from the stop piece 29 so that the blade 18, on operation of the releasing device 19, performs the required cut-off movement. The cut-off movement is accomplished by a pair of loading springs 34 having their lower ends on the upper edge of the blade 25 and their upper ends against the cover 6, such as on a member built unitary with the guide rails 27. The springs 34 are held under tension during the arrested or raised position of the cut-off blade 18 so that upon operation of the releasing device 19, the springs 34 press the blade 25 downwardly with considerable force into the released position, as shown in FIGURE 3.

In order to return the cut-off blade 18 from the released position shown in FIGURE 3 to the arrested, clamped or raised position shown in FIGURE 2, a spanning device is provided to go into operation upon raising the cover 6 to the up position. The spanning device includes a slide block 36 which is slidably carried within an open chamber defined at the top of the blade 25. This device is slidable both in the vertical direction, parallel to the blade 25, and in the horizontal direction, perpendicular to the blade 25. The connecting portion 35 of the blade 18 extends between the two guide rails 27 into the space between the blade 25 and the front guide column 7. The slide block 36 has two oblique wedge surfaces 37 and 38 at its upper end. The surface 37 is positioned to engage a countersurface formed on a lug 40 of the front guide column 7. The outer edge surface of the blade portion 35 desirably has a sloping surface corresponding to the wedge surface 37.

When the cover 6 is lowered, a multiplicity of small set springs 39 press the slide blocks 36 away from the blade portion 25 and against the outer wall of the portion 35, so that the two wedge surfaces 37 and 38, with the possible exception of a small portion of the surface 38 which lies against the countersurface of the blade, are free of engaging surfaces. During most of the lifting movement of the cover 6, the slide block 36 is in this position. Shortly before the upper position of the cover 6 is reached, the wedge surface 37 bears against the stationary counter-surface of the lug 40. The slide block 36 no longer follows the lifting movement of the cover 6. At first, the block 36 slides downwardly until its lower surface is on the base of the connecting portion 36 or a shoulder below the wedge surface 37 bears against the upper edge of the upper beveled edge of the portion 36. Upon further movement of the cover 6, the slide block 36 slides along the stationary countersurface of the lug 40 with its wedge 37 so that the blade moves toward the blade portion 25. This creates a sliding movement between the second wedge surface 38 of the slide block and the beveled inside shoulder of the blade portion 40, resulting in upward movement of the blade portion 25. In the upper position of the cover 6, the slide block 36 has been shifted against the blade 25, and the blade 25 has been raised so that the arresting latch 30 engages the corresponding blade recess. Thus, when the upper position of the cover 6 is reached, the blade 25 is automatically brought into its upper, clamped end position and is arrested in this position.

In the lowering of the cover 6, the blade 25 remains in the arrested position, while the slide block 36 is moved away from the blade 25 again by the compression springs 39 and bears against the outer wall of the added piece 35. As a result, the slide block 36 does not hamper the releasing of the cut-off blade 18 when the cover 6 is lowered.

In the embodiment of FIGURE 6, the blade 43 of the cut-off blade assembly 18 is slidably mounted between two guide plates 44 and 45 mounted on the cover 6 and has loading springs 46 acting against its upper edge. The springs 46 are supported in the cover by a support 47. The cut-off blade 18 coacts with a releasing device 19, which in construction and manner of operation corresponds generally to the releasing device of FIGURES 2 to 5. A clamping device like the clamping device of FIGURES 2 to 5 causes the cut-off blade 18, on reaching the upper position of the cover 6, to be held in the arrested position. This clamping device, however, has a different construction.

An important element of the clamping device used in FIGURE 6 is a two-armed lever 48, which is swingably mounted inside the cover 6 in the space between the blade 43 and the front guide column 7. The lever, at one end of its stroke, interacts with a projecting stop lug 50 on the blade 43 and, at the other end of its stroke, contacts a fixed stop lug 51 on the guide column 7. The stop lug 50 extends through an elongated opening 53 in the guide plate 45, above the lever 48, and into the space between the blade 43 and the guide column 7. In the zone of the opening 53, the latch 30 of the releasing device 19 engages the blade 43.

When the cover 6 is lowered but the cut-off blade 18 is arrested, the stop lug 50 is spaced from the lever 48 a distance which corresponds to the required cut-off stroke of the cut-off blade 18. The lever 48 is held in a generally horizontal position by a small tension spring 52. The blade end of the lever 48 is against the lower edge of the opening 53 in the guide plate 45. After releasing the cut-off blade 18, the blade end of the lever 48 becomes the lower boundary for the cut-off movement of the cut-off blade 18 as the stop lug 50 strikes against the end of the lever.

When the cover 6 is raised, the position of the released cut-off blade 18 and of the lever 48 remains in effect until before the upper position of the cover 6 is reached. The column end of the lever 48 then bears against the column stop lug 51. At this time, upon further lifting of the cover 6, the lever 48 swings about its pivot bearing 49 so that the blade end of lever 48 is lifted from the guide plate 45 and moves upwardly. Because of the stop lug 50, the blade 43 is raised with respect to the cover 6 until it finally reaches, in the upper position of the cover 6, a position at which the latch 30 of the releasing device 19 arrests the movement cut-off blade 18. In the lowering of the cover 6, the cut-off blade 18 retains the arrested position, while the lever 48 as soon as it moves out of contact with the stop lug 51, again moves against the guide plate 45 for another cycle of operation.

The embodiments of FIGURES 2 to 5 and of FIGURE 6 are generally similar in operation and differ primarily in construction. The embodiments of FIGURES 7 and 8, however, have a different principle of operation. In these embodiments, the cut-off blade 18 is not arrested in the raising of the cover 6 into the upper position, but rather only in the subsequent lowering of the cover 6 into the lowered position.

In the embodiment of FIGURE 7, the blade 56 of the cut-off blade 18 is slidably carried between two guide plates 57 and 58. One of the guide plates 57 and 58 has a recess 59 into which a stop lug 60 on the blade 56 extends. This stop lug 60 serves as the lower limit for the cut-off movement of the cut-off blade 18, and has no further functions to fulfill. The upper edge of the blade 56 is acted upon, as in the previous embodiments, by loading springs 61, which are supported on a cover engaging support 62.

In the embodiment of FIGURE 7, a special clamping device is not provided. Instead the releasing device 19' acts simultaneously to also clamp the cut-off blade 18. This releasing device 19' is positioned below the cut-off blade 18 in the base 2 and is contained within a recess 66 of the base 2. An arm 63, in the form of a cam, is secured to a shaft 64. By operation of a handle 65 secured to the shaft 64, limited swinging movement can be imparted to shaft 64. The shaft 64 is carried in the base 2 and, for securing the handle 65 thereto, is advantageously conducted outwardly on one or both sides of the base 2. To facilitate the assembly of the shaft 64, the shaft is accessible through auxiliary apertures 67.

The arm 63 projects upwardly from the recess 66 in the base 2. The arm preferably is located in the longitudinal central plane of the base 2, wherein the guide columns 7 are also located so that no guide grooves for the incoming plastic strings 10 are located therein. Above the base 2, the arm 63 extends through a recess 69 in the deflection block 17. Above the deflection block, the arm is bent over to provide a cam-like support 63'. When the handle 65 is at rest, the arm 63 is pressed into the rest position by a pressure spring 68 secured to the deflecting block 17. In this position, the support 63' is directly below the cutting edge 20 of the cut-off blade 18. Advantageously, a recess 70 is provided in the cutting edge 20 for receiving the support 63'.

When the cover 6 is lowered, the stop lug 60 of the blade 56 lies on the lower edge of the guide plate 58, that is the cut-off blade 18 is in its lowered position. Just before reaching the lowered position of the cover 6, the cut-off blade 18 with its recess 70 moves against the support 63' of the rest arm 63. The cut-off blade 18 then comes to a stop while the cover 6 descends somewhat further to its fully lowered position. In the last part of the lowering movement of the cover 6, the cut-off blade 18 is arrested by the rest arm 63 and is simultaneously raised with the cover 6, so that the loading springs 61 are compressed. For releasing of the cut-off blade 18, the support 63', by a slight swinging of the rest arm 63 through the handle 65, is moved out of the recess 70. In this way, the cut-off blade 18 strikes its lower, released position where it remains until the cover 6 has again been raised and lowered.

The embodiment of FIGURE 8 corresponds generally to the embodiment of FIGURE 7 except that the swingable rest arm 63 is replaced by a slidable member 73. This member 73 is carried in a bore 74 of the base 2. It is pressed by a relatively weak spring 75 into the rest position. In the rest position, the upper end of the member protrudes from the base 2 past the edge 21 of the deflection block 17 and up to a height at which the cut-off blade 18 is to be arrested upon lowering the cover 6. This rest position of the member 73 is fixed by a stop bolt 76, which is slidably mounted in a stepped transverse bore 77 in the base 2. The stop bolt 76 is pressed by a compression spring 78 into a recess 79 in the slidable member or bolt 73. Shortly before completing the lowering of the cover 6, the cut-off blade 18, advantageously having a recess 70, rests on the stop bolt 73.

When the cover 6 is fully lowered, the stop bolt 76 is drawn out of the recess 79, by pulling the handle 80, which projects from the base 2. The cut-off blade 18 can then move downwardly. The loading springs of the cut-off blade are considerably stronger than the return spring 75 so that the slidable bolt 73, after its release, is immediately pressed downward by the cut-off blade 18. In the subsequent raising of the cover 6, the bolt 73 follows the upward movement of the cut-off blade 18, until its recess 79 engages the stop bolt 76. In this way, the slidable bolt 73 is ready, in the re-lowering of the cover 6, to again arrest movement of the cut-off blade 18.

While in the foregoing there has been provided a detailed description of particular embodiments of the present invention, it is to be understood that all equivalents obvious to those skilled in the art are to be included within the scope of the invention as claimed.

What I claim and desire to secure by Letters Patent is:

1. A granulator for cutting continuously extruded plastic string, said granulator comprising a fixed base, a movable cover for said base, guide means for said plastic string defined between said base and the said cover, means for feeding said string along said guide means, means intersecting said guide means for cutting said string, a portion of said guide means intercepting said guide means and by-passing said cutting means, a blade member movably mounted at the place of interception of said guide means by said by-pass portion, means for arresting said blade in the raised position when said cover is down and against said base, and means for releasing said blade to cause simultaneous severing of plastic string passing from the guide means, prior to said place of interception, to the by-pass portion, blocking the by-pass portion, and causing introduction of the string to the guide means after said place of interception for leading the string to the cutting means.

2. The device of claim 1 wherein said guide means prior to said place of interception and said by-pass portion are covered by said cover when the cover is in the lowered position and are exposed when the cover is in the raised position.

3. The device of claim 1 wherein said guide means, including said by-pass portion, are defined by guide grooves.

4. The device of claim 1 wherein a block member is defined between said by-pass portion and the portion of said guide means after said place of interception.

5. The device of claim 1 wherein said feeding means includes feed rollers in the portion of said guide means before said point of interception, feed rollers in said by-pass portion, and said feed rollers all being driven in synchronization.

6. The device of claim 1 wherein spring means bias said movable blade towards said place of interception, said arresting means holding said blade in the raised position in opposition to the action of said spring means, said blade being raised to the upper end position upon moving said cover to the raised position.

7. The device of claim 6 including a clamping member which engages a stop member before said cover reaches the fully raised position so as to clamp the movable blade into its raised position.

8. The device of claim 7 wherein the clamping means includes a slide block movable in a vertical direction and in a horizontal direction within said movable blade, a pair of oppositely angled surfaces on said slide block, a stationary stop for engaging one of said surfaces to move the slide block against the blade, and said other surface cooperating with a portion of said blade to move the blade upwardly relative to the cover.

References Cited

UNITED STATES PATENTS

| | | | |
|---|---|---|---|
| 394,950 | 12/1888 | Badger | 83—355 |
| 1,978,826 | 10/1934 | Walton et al. | 83—444 X |
| 3,333,298 | 8/1967 | List et al. | 83—355 X |

JAMES M. MEISTER, *Primary Examiner.*

U.S. Cl. X.R.

83—355, 357, 444, 587